US008315017B2

(12) United States Patent
Katayama

(10) Patent No.: US 8,315,017 B2
(45) Date of Patent: Nov. 20, 2012

(54) MAGNETIC RECORDING MEDIUM, MAGNETIC SIGNAL REPRODUCTION SYSTEM AND MAGNETIC SIGNAL REPRODUCTION METHOD

(75) Inventor: Kazutoshi Katayama, Odawara (JP)

(73) Assignee: Fujifilm Corporation, Tokyo (JP)

( * ) Notice: Subject to any disclaimer, the term of this patent is extended or adjusted under 35 U.S.C. 154(b) by 341 days.

(21) Appl. No.: 12/662,010

(22) Filed: Mar. 29, 2010

(65) Prior Publication Data

US 2010/0246073 A1 Sep. 30, 2010

(30) Foreign Application Priority Data

Mar. 27, 2009 (JP) ................................. 2009-078157

(51) Int. Cl.
 *G11B 5/708* (2006.01)
 *G11B 5/70* (2006.01)
(52) U.S. Cl. ................... 360/134; 428/844.4; 428/845.5
(58) Field of Classification Search ................... 360/134; 428/141, 842.8, 842, 845.5, 844.4
See application file for complete search history.

(56) References Cited

U.S. PATENT DOCUMENTS

| 5,512,350 A | 4/1996 | Ryoke et al. |
| 5,718,964 A | 2/1998 | Naoe et al. |
| 6,120,877 A * | 9/2000 | Deno et al. .................... 428/141 |
| 7,169,438 B2 * | 1/2007 | Tomaru et al. ................. 427/128 |
| 7,344,786 B2 * | 3/2008 | Tomaru et al. .............. 428/840.1 |
| 7,381,484 B2 * | 6/2008 | Ejiri ........................... 428/845.1 |
| 7,995,309 B2 * | 8/2011 | Kakuishi et al. .............. 360/134 |
| 2004/0214048 A1 | 10/2004 | Ide et al. |

FOREIGN PATENT DOCUMENTS

| EP | 2001014 | 12/2008 |
| EP | 2026337 | 2/2009 |
| JP | 06-052541 | 2/1994 |
| JP | 09-128739 | 5/1997 |
| JP | 2004-326863 | 11/2004 |
| JP | 2005-129182 A | 5/2005 |
| JP | 2005-216349 | 8/2005 |

* cited by examiner

*Primary Examiner* — Will J Klimowicz
(74) *Attorney, Agent, or Firm* — Jean C. Edwards, Esq.; Edwards Neils PLLC

(57) ABSTRACT

An aspect of the present invention relates to a magnetic recording medium comprising a magnetic layer comprising a ferromagnetic powder and a binder on a nonmagnetic support. A height of protrusions with a protrusion density of 0.002 protrusion/$\mu m^2$ or lower on a surface of the magnetic layer as measured by AFM is 40 nm or lower; a density of protrusions that are 15 nm or higher in height on the surface of the magnetic layer as measured by AFM ranges from 0.01 to 0.18 protrusion/$\mu m^2$; and the protrusions that are 15 nm or higher in height include protrusions formed of carbon black and protrusions formed of a substance with a Mohs' hardness exceeding 7, and an average height of the protrusions formed of carbon black is greater than an average height of the protrusions formed of the substance with a Mohs' hardness exceeding 7.

9 Claims, 2 Drawing Sheets

MAGNETIC RECORDING MEDIUM, MAGNETIC SIGNAL REPRODUCTION SYSTEM AND MAGNETIC SIGNAL REPRODUCTION METHOD

CROSS-REFERENCE TO RELATED APPLICATIONS

This application claims the benefit of priority under 35 USC 119 to Japanese Patent Application No. 2009-078157, filed on Mar. 27, 2009, which is expressly incorporated herein by reference in its entirety.

BACKGROUND OF THE INVENTION

1. Field of the Invention

The present invention relates to a magnetic recording medium, and more particularly, to a magnetic recording medium having excellent electromagnetic characteristics and friction characteristics.

The present invention further relates to a magnetic signal reproduction system and magnetic signal reproduction method employing the magnetic recording medium.

2. Discussion of the Background

In recent years, technology to transfer information at high speed have developed markedly, making it possible to transfer images and data comprised of immense amounts of information. As the quantity of such data has increased and data transfer technology has improved, there has been a demand to further increase the recording density and transfer rate of recording and reproduction devices and recording media for recording, reproducing, and storing information.

The use of ferromagnetic powder selected from fine particles and fine dispersion of ferromagnetic powder to make the surface of the magnetic layer smooth are effective ways to increase the recording density and transfer rate. An increase in the sensitivity of the reproduction head commensurate with the increase in high density recording is underway on the recording and reproduction device side. In recent years, higher sensitivity giant magneto resistive head (called "GMR head") have been proposed. However, when a highly sensitive GMR head is employed as a reproduction head, noise also ends up being detected with high sensitivity.

Accordingly, in systems employing GMR heads as reproduction heads, it becomes necessary to reduce noise on the medium side. Making the magnetic layer surface smooth as set forth above is also effective in this regard. However, the smoother the surface of the magnetic layer is made, the greater the coefficient of friction as the reproduction head slides over the medium becomes, compromising running durability.

One conceivable means of improving the frictional characteristics of the medium is to reduce the area of contact when the head is sliding over the medium by forming protrusions on the surface of the magnetic layer. In this regard, controlling the presence of protrusions on the surface of the magnetic layer is proposed, for example, in Japanese Unexamined Patent Publication (KOKAI) Heisei No. 9-128739 or English language family member U.S. Pat. No. 5,718,964, Japanese Unexamined Patent Publication (KOKAI) No. 2004-326863 or English language family member US 2004/0214048 A1, Japanese Unexamined Patent Publication (KOKAI) Heisei No. 6-52541 or English language family member U.S. Pat. No. 5,512,350, and Japanese Unexamined Patent Publication (KOKAI) No. 2005-216349, which are expressly incorporated herein by reference in their entirety.

However, when protrusions are formed on the surface of the magnetic layer as described in the above-cited publications, despite enhanced running durability, increased spacing between the head and medium ends up compromising electromagnetic characteristics. In addition, the protrusions may cause noise, and when the protrusions are reduced, dynamic friction and static friction increase, making it difficult to achieve stable running. Therefore, conventionally, there has thus been a tradeoff between electromagnetic characteristics and friction characteristics, and it has been difficult to achieve them both.

SUMMARY OF THE INVENTION

An aspect of the present invention provides for a magnetic recording medium affording both excellent electromagnetic characteristics and friction characteristics, and more particularly, for a magnetic recording medium that is suited to magnetic signal reproduction systems employing giant magneto resistive (GMR) heads as reproduction heads.

The present inventors conducted extensive research into achieving the above-stated magnetic recording medium, resulting in the following discoveries.

(1) It was possible to increase the smoothness of the magnetic layer surface and thus enhance magnetic characteristics by eliminating protrusions exceeding 40 nm in height from the surface of the magnetic layer.

(2) However, when no protrusions whatsoever were present on the surface of the magnetic layer, the medium and head stuck during running, markedly compromising friction characteristics. Accordingly, the present inventors ensured friction characteristics by forming protrusions with a height falling within a range of 40 nm and below on the surface of the magnetic layer. However, when the protrusions contacting the head at the start of running were formed of a hard abrasive, the initial coefficient of friction increased and stable running become difficult.

(3) It was possible to lower the initial coefficient of friction by forming the protrusions contacting the head at the start of running out of carbon black. This was attributed to carbon black playing the role of a solid lubricant. However, the protrusions formed of carbon black were soft, and were thus deformed and crushed by contact pressure with the head, tending to result in surface contact and causing an increase in the coefficient of friction, despite a reduction in initial friction. Further, carbon black had poor resistance to abrasion with repeat running, and in addition to being a factor in deformation, the fact that the protrusions wore down with running sometimes caused an increase in the coefficient of friction.

(4) By contrast, the present inventors discovered through research that it was possible to enhance frictional characteristics during running by forming low protrusions of a hard substance such as an abrasive in addition to forming high protrusions of carbon black. This was because the protrusions formed of the hard substance were capable of maintaining point contact without being deformed by contact pressure with the head. When low protrusions were formed of a hard substance in addition to forming high protrusions of carbon black, even when the protrusions formed of carbon black deformed and collapsed due to contact pressure with the head, the protrusions formed of a hard substance maintained point contact, thereby ensuring friction characteristics during running. It was also possible to prevent excessive contact pressure on the protrusions formed of carbon black by having the protrusions formed of a hard substance bear the contact pressure with the head.

That is, the protrusions formed of carbon black that functioned to reduce friction as a solid lubricant came into contact with the head and were deformed by receiving a certain degree of contact pressure. The solid lubricant function of carbon black was realized through this contact. However, surface contact tended to occur when the contact pressure increased in this manner. Accordingly, providing protrusions formed of a hard substance at suitably low positions bore the contact pressure, both allowing the carbon black to function as a solid lubricant and achieving a state of point contact.

The present inventors conducted further research based on the above discoveries, permitting them to devise the present invention.

An aspect of the present invention relates to a magnetic recording medium comprising a magnetic layer comprising a ferromagnetic powder and a binder on a nonmagnetic support, wherein a height of protrusions with a protrusion density of equal to or lower than 0.002 protrusion/$\mu m^2$ on a surface of the magnetic layer as measured by an atomic force microscope is equal to or lower than 40 nm;

a density of protrusions that are equal to or higher than 15 nm in height on the surface of the magnetic layer as measured by an atomic force microscope ranges from 0.01 to 0.18 protrusion/$m^2$; and the protrusions that are equal to or higher than 15 nm in height include protrusions formed of carbon black and protrusions formed of a substance with a Mohs' hardness exceeding 7, and an average height of the protrusions formed of carbon black is greater than an average height of the protrusions formed of the substance with a Mohs' hardness exceeding 7.

Among the protrusions that are equal to or higher than 15 nm in height, a difference between the average height of the protrusions formed of carbon black and that of the protrusions formed of the substance with a Mohs' hardness exceeding 7 may be equal to or greater than 1 nm but equal to or lower than 10 nm.

Among the protrusions that are equal to or higher than 15 nm in height, a density of protrusions formed of carbon black, referred to as "PA", hereinafter, and that of the protrusions formed of the substance with a Mohs' hardness exceeding 7, referred to as "PB", hereinafter, may satisfy a relation of $0.01 \leq PB/PA \leq 2.0$.

The magnetic layer may have an average surface roughness, Ra, as measured by an atomic force microscope, of equal to or greater than 0.5 nm but equal to or lower than 3.0 nm.

The substance with a Mohs' hardness exceeding 7 may be alumina or silicon carbide.

The magnetic layer may have a thickness ranging from 0.01 to 0.1 $\mu m$.

The ferromagnetic powder may be a hexagonal ferrite powder.

A further aspect of the present invention relates to a magnetic signal reproduction system comprising a magnetic recording medium and a reproduction head, wherein the magnetic recording medium is the above magnetic recording medium, and the reproduction head is a giant magneto resistive magnetic head.

A still further aspect of the present invention relates to a magnetic signal reproduction method reproducing magnetic signals that have been recorded on a magnetic recording medium with a reproduction head, wherein the magnetic recording medium is the above magnetic recording medium, and the reproduction head is a giant magneto resistive magnetic head.

The present invention can achieve both surface smoothness and friction characteristics, and can thus provide a magnetic recording medium that affords both excellent electromagnetic characteristics and running durability.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

DETAILED DESCRIPTION OF THE EMBODIMENTS

Figure 1:
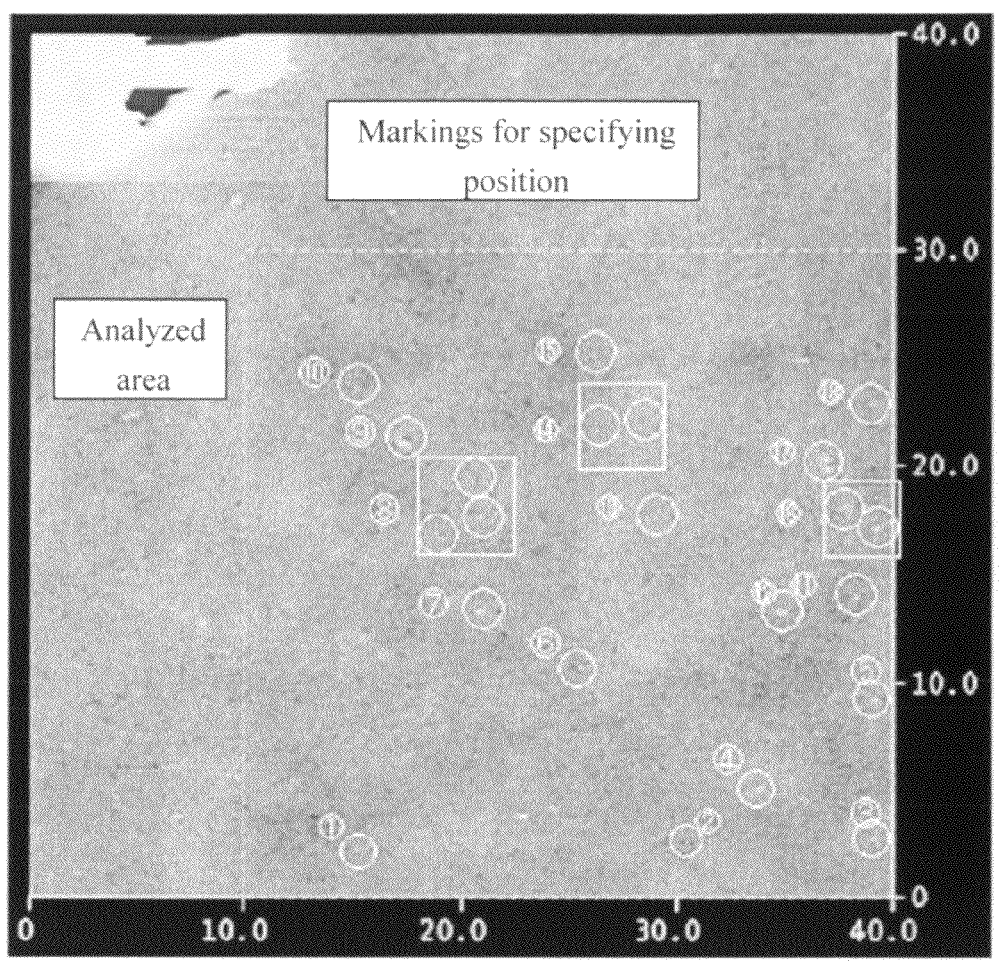
FIG. 1 is a descriptive image (top view taken by an atomic force microscope, AFM) of the method of specifying protrusion-forming components.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The present invention relates to a magnetic recording medium comprising a magnetic layer comprising a ferromagnetic powder and a binder on a nonmagnetic support. The magnetic recording medium of the present invention has surface properties (1) to (3) below, thereby achieving excellent electromagnetic characteristics and friction characteristics.

(1) The height of protrusions with a protrusion density of equal to or lower than 0.002 protrusion/μm² on the surface of the magnetic layer as measured by an atomic force microscope is equal to or lower than 40 nm.

(2) The density of protrusions that are equal to or higher than 15 nm in height on the surface of the magnetic layer as measured by an atomic force microscope ranges from 0.01 to 0.18 protrusion/μm².

(3) The protrusions that are equal to or higher than 15 nm in height include protrusions formed of carbon black and protrusions formed of a substance with a Mohs' hardness exceeding 7, and the average height of the protrusions formed of carbon black is greater than the average height of the protrusions formed of the substance with a Mohs' hardness exceeding 7.

The present invention further relates to magnetic signal reproduction system comprising a magnetic recording medium and a reproduction head, wherein the magnetic recording medium is the magnetic recording medium of the present invention, and the reproduction head is a giant magneto resistive magnetic head.

The present invention still further relates to a magnetic signal reproduction method reproducing magnetic signals that have been recorded on a magnetic recording with a reproduction head, wherein the magnetic recording medium is the magnetic recording medium of the present invention, and the reproduction head is a giant magneto resistive magnetic head.

The magnetic layer surface properties of the magnetic recording medium of the present invention will be described in the order of (1) to (3) above. Measurement of surface protrusions by an atomic force microscope (AFM) in the present invention is conducted for an area 40 μm square (40 μm×40 μm), and consists of determining the height of the protrusions on a reference plane (0 nm in height) in the form of a plane in which the volume of protrusions and pits is equal by targeting an area 30 μm square excluding markings used for positioning within the 40 μm square of the magnetic layer surface with a triangular pyramid-shaped probe with a tip radius of curvature (nominal value) of less than 100 nm fabricated by processing a single crystal of silicon.

In the magnetic recording medium of the present invention, the height of protrusions with a protrusion density of equal to or lower than 0.002 protrusion/μm² on the surface of the magnetic layer as measured by an atomic force microscope, AFM (referred to hereinafter as the "maximum protrusion height") is equal to or lower than 40 nm. This means that in AFM measurement, protrusions exceeding 40 nm in height are essentially absent. In AFM measurement, there are cases where abnormal protrusions that are present in extremely small number and essentially do not affect sliding properties or the like, or noise components, are extracted as protrusions. When the density of protrusions of a given height, including these abnormal protrusions and noise components, is 0.002 protrusion/μm², a determination can be made that protrusions of that height are essentially absent. When the height of protrusions with a protrusions density of equal to or lower than 0.002 protrusion/μm² on the surface of the magnetic layer as measured by AFM exceeds 40 nm, electromagnetic characteristics deteriorate due to spacing loss. To achieve better electromagnetic characteristics, the height of these protrusions is desirably equal to or lower than 39 nm, preferably equal to or lower than 38 nm. In the present invention, the height of the maximum protrusions is equal to or greater 15 nm because protrusions that are equal to or higher than 15 nm in height are provided on the surface of the magnetic layer.

In the magnetic recording medium of the present invention, the density of protrusions that are equal to or higher than 15 nm in height on the surface of the magnetic layer as measured by AFM ranges from 0.01 to 0.18 protrusion/μm². When the density of the above protrusions is less than 0.01 protrusion/m², the coefficient of friction during sliding against the head increases markedly, compromising stable running. When 0.18 protrusion/μm² is exceeded, the probability of the high protrusions that cause spacing loss being present increases and electromagnetic characteristics deteriorate. The upper limit of the above protrusion density is desirably equal to or lower than 0.178 protrusion/μm², preferably equal to or lower than 0.172 protrusion/μm². The lower limit of the above protrusion density is desirably equal to or greater than 0.007 protrusion/μm², preferably equal to or greater than 0.011 protrusion/m².

Since a long wavelength waviness component is present on the surface of the magnetic layer, when the height above the reference plane is less than a certain amount, the protrusion ends up absorbing the waviness component and cannot be detected as a protrusion. Since a height of about 15 nm is required to form a protrusion, the reference value of a protrusion height of 15 nm has been adopted.

In the magnetic recording medium of the present invention, the protrusions that are equal to or higher than 15 nm in height include protrusions formed of carbon black and protrusions formed of a substance with a Mohs' hardness exceeding 7

In the present invention, the phrase, "protrusions formed of carbon black" means that the component contained in the largest quantity in the solid components constituting a protrusion is carbon black. The same applies for "a protrusion formed of a substance with a Mohs' hardness exceeding 7." The components constituting a protrusion can be analyzed by energy dispersive X-ray spectrometry (EDS, also referred to as EDX), auger electron spectroscopy (AES), or the like. "Protrusions formed of carbon black" will also be referred to as "carbon black protrusions," "substances having a Mohs' hardness exceeding 7" as "hard substances," and "protrusions formed of substances having a Mohs' hardness exceeding 7" as "hard protrusions" hereinafter. Carbon black has a Mohs' hardness of about 4. Thus, carbon black protrusions are softer than hard protrusions. In the present invention, the average height of the carbon black protrusions is made greater than the average height of the hard protrusions so that these soft carbon black protrusions contact the head at the start of running. Thus, good friction characteristics can be maintained during running. The details of this point are as set forth above.

When the difference between the average height of the carbon black protrusions and that of the hard protrusions is excessively small, the solid lubricant function realized by carbon black protrusions contacting the head at the start of running may be inadequate, resulting in high initial friction. Thus, the difference between the two is desirably equal to or greater than 1 nm. When the difference between the two is excessively large, the carbon black may undergo deformation exceeding what is optimal, promoting abrasion of the carbon black protrusions. Therefore, to achieve point contact by the hard protrusions and to prevent excessive contact pressure from being exerted on the carbon black protrusions, the difference between the two is desirably kept to equal to or lower than 20 nm. From the perspective of maintaining good friction characteristics during running, the difference in average height between the carbon black protrusions and the hard protrusions desirably ranges from 1 to 10 nm. From the same perspective, among protrusions of equal to or higher than 15 nm in height, the maximum height of the hard protrusions is desirably less than the maximum height of the carbon black protrusions.

The Mohs' hardness of the substance forming the hard protrusions (hard substance) is greater than 7. This is because there is a concern of deformation due to contact pressure with the head for substances with a Mohs' hardness of equal to or less than 7. The Mohs' hardness of the hard substance is desirably equal to or greater than 8. Since the Mohs' hardness scale only goes up to 10, the maximum Mohs' hardness of the hard substance is 10. From the perspective of inhibiting head abrasion, the Mohs' hardness of the hard substance is desirably equal to or lower than 9. Examples of the hard substances are those employed as abrasives in magnetic layers such as alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, and diamond powder. Of these, alumina and silicon carbide are preferable. These hard substances may be acicular, spherical, cubic, or the like in shape. The presence of some angular component to the shape is desirable because of good abrasive properties.

As set forth above, the magnetic recording medium of the present invention has magnetic layer surface properties (1) to (3) above, enabling it to afford excellent electromagnetic characteristics and friction characteristics.

The following methods can be used in any combination to control the surface properties of the magnetic layer:

(a) Adjusting the dispersion conditions (dispersion retention time, particle diameter of dispersion medium, and the like) of the magnetic coating composition;

(b) Adjusting the particle diameter and quantity added of the carbon black and hard substance in the magnetic layer;

(c) Adjusting the calendering conditions (calendering temperature, processing rate, pressure, and the like);

(d) Adjusting the method of preparing the magnetic coating composition;

(e) The method of forming the nonmagnetic layer;

(f) The surface treatment of the magnetic layer; and (g) Adjusting the deformation characteristics of the nonmagnetic support.

The above control methods will be specifically described next.

(a) Adjusting the Dispersion Conditions (Dispersion Retention Time, Particle Diameter of Dispersion Medium, and the Like) of the Magnetic Coating Composition The dispersion retention time depends on the peripheral speed of the tip in the dispersion apparatus and on the fill rate of the dispersion medium. It can be set to, for example, 0.5 to 10 hours, desirably 1 to 7 hours, and preferably, 2 to 5 hours. The peripheral speed of the tip of the dispersion apparatus is desirably 5 to 20 m/s, preferably 7 to 15 m/s. A dispersion medium in the form of zirconia beads is desirably employed. The particle diameter thereof is desirably 0.1 to 1 mm, preferably 0.1 to 0.5 mm. The fill rate of the dispersion medium can be 30 to 80 percent, desirably 50 to 80 percent. In the present invention, the fill rate is denoted as a volume reference. The stronger the dispersion, the more the maximum protrusion height tends to decrease.

(b) Adjusting the Particle Diameter and Quantity Added of the Carbon Black and Hard Substance in the Magnetic Layer The average primary particle diameter of the carbon black in the magnetic layer is, for example, 10 to 200 nm, desirably 50 to 150 nm, and preferably, 70 to 120 nm. The quantity of carbon black in the magnetic layer is desirably 0.1 to 5 weight parts, preferably 0.15 to 2 weight parts, per 100 weight parts of ferromagnetic powder. The average primary particle diameter of the hard substance in the magnetic layer is, for example, 10 to 150 nm, desirably 30 to 150 nm, and preferably, 50 to 120 nm. The quantity of the hard substance in the magnetic layer is desirably 1 to 20 weight parts, preferably 2 to 15 weight parts, per 100 weight parts of ferromagnetic powder.

(c) Adjusting the Calendering Conditions (Calendering Temperature, Processing Rate, Pressure, and the Like)

Examples of calendering conditions are the type and number of stages of calendering rolls, the calendering pressure, the calendering temperature, and the calendering speed. The more intense the calendering, the greater the smoothness of the surface of the magnetic layer and the lower the maximum protrusion height tends to become. The calendering pressure is, for example, 200 to 500 kN/m, preferably 250 to 350 kN/m. The calendering temperature is, for example, 70 to 120° C., desirably 80 to 100° C. The calendering speed is, for example, 50 to 300 m/min, desirably 100 to 200 m/min. The harder the surface of the calendering rolls employed, or the greater the number of stages, the smoother the surface of the magnetic layer tends to be. Thus, the number of protrusions can be adjusted by means of the combination of calendering rolls and the number of stages.

(d) Adjusting the Method of Preparing the Magnetic Coating Composition

Since aggregation of powders in the magnetic coating composition causes the formation of coarse protrusions, powders that aggregate readily are desirably separately dispersed. For example, after separately dispersing abrasives and/or carbon black, they can be added to the magnetic coating composition to reduce the number of coarse protrusions on the surface of the magnetic layer, as well as increase the number of minute protrusions on the surface of the magnetic layer. In case of some kind of abrasives, excessive dispersion will excessively disperse or damage the abrasive, thereby sometimes precluding the abrasive from forming protrusions with a height of equal to or higher than 15 nm. On the other hand, the finer the particles of ferromagnetic powder and carbon black, the more difficult dispersion becomes, so adequate dispersion processing is desirable. When varying the optimal dispersion conditions based on the various particulate substances in this manner, the dispersion liquid (magnetic coating composition) containing the ferromagnetic powder, the dispersion liquid containing the carbon black (liquid containing dispersed carbon black powders), and the dispersion liquid containing the abrasive (liquid containing dispersed abrasive powders) are desirably separately dispersed and prepared, and then simultaneously or sequentially mixed to prepare the magnetic coating composition.

(e) The Method of Forming the Nonmagnetic Layer

In the magnetic recording medium of the present invention, a nonmagnetic layer comprising a nonmagnetic powder and a binder may be present between the nonmagnetic support and magnetic layer. In a magnetic recording medium having a nonmagnetic layer, the surface state of the nonmagnetic layer may affect the surface properties of the magnetic layer. Thus, the method of forming the nonmagnetic layer can be used to control the surface properties of the magnetic layer. Specifically, (i) sequential multilayer coating in which the nonmagnetic coating composition is applied and dried, after which the magnetic coating composition is applied (wet-on-dry) may be conducted, or (ii) the surface properties of the magnetic layer can be controlled based on the nonmagnetic layer forming method (adjustment of the coating method, calendering method, thermoprocessing, or the like) in (i) above. The surface smoothness of the nonmagnetic layer can be increased through a leveling effect by employing a radiation-curing resin as binder in the nonmagnetic layer. Thus, the maximum protrusion height can be decreased.

(f) The Surface Treatment of the Magnetic Layer

Surface treatment can be conducted, for example, by knife blade or lapping tape. All the materials employed in common knives, such as stainless steel, sapphire, and chromium steel, can be employed as the knife blade material. A lapping tape with a coarseness falling within a range of #300 to #10,000, for example, can be employed. The knife blade or lapping tape can be pressed against the magnetic surface at an angle falling within a range of 90 to 5 degrees, for example, in the opposite direction from the running direction of the tape to remove foreign matter (higher protrusions) from the surface of the tape.

Such surface treatment can reduce the coarse protrusions on the surface of the magnetic layer and lower the maximum protrusion height.

(g) Adjusting the Deformation Characteristics of the Nonmagnetic Support

In a magnetic recording medium in which there is no nonmagnetic layer, the carbon black and hard substance in the magnetic layer can come into contact with the nonmagnetic support. In such a magnetic recording medium, the deformation characteristics of the nonmagnetic support, such as its hardness and modulus of elasticity, can be adjusted to adjust the height of the protrusions on the surface of the magnetic layer through variation in the amount of burying of particles in the support.

Protrusions other than carbon black protrusions and hard substance protrusions, such as protrusions formed of ferromagnetic powder, can be included among the protrusions of equal to or higher than 15 nm in height. However, in the magnetic recording media that have been developed in recent years to achieve high recording densities, in contrast to conventional magnetic recording media, the size of the ferromagnetic powder and abrasives has been reduced and designed to yield greater uniformity in a dispersed state. Thus, the trend has been for the magnetic powder, binder components, and the like not to form high protrusions. From the perspective of enhancing friction characteristics by means of carbon black protrusions and hard protrusions, the proportion of protrusions that are equal to or higher than 15 nm in height that is accounted for by carbon black protrusions is desirably 30 to 99 percent, and that accounted for by hard protrusions is desirably 1 to 65 percent. To achieve the above-described improvement in initial friction characteristics by means of carbon black protrusions and the enhanced friction characteristics during running by means of hard protrusions, the carbon black protrusions and hard protrusions are desirably present in a suitable ratio. From this perspective, denoting the protrusion density of carbon black protrusions as PA and the protrusion density of hard protrusions as PB, PA and PB desirably satisfy the relation of $0.01 \leq PB/PA \leq 2.0$, preferably satisfy the relation of $0.012 \leq PB/PA \leq 1.95$. The PB/PA ratio and the carbon black protrusion and hard protrusion ratio can be adjusted by means of the particle diameter of the carbon black and hard substance, the method of addition, the addition conditions, the quantities added, and the like, as set forth above.

The presence of carbon black protrusions of a height at which no hard protrusions exist is desirable so that the carbon black protrusions will function as a solid lubricant and point contact with the head will be maintained by the hard protrusions. From this perspective, the protrusion height at which the density of carbon black protrusions becomes equal to or lower than 0.02 protrusion/$\mu m^2$ (the height at which carbon black protrusions essentially cease to be present) is desirably greater than the protrusion height at which the density of hard protrusions becomes equal to or lower than 0.02 protrusion/$\mu m^2$ (the height at which the hard protrusions essentially cease to be present), as measured by AFM. However, the larger this difference becomes, the less possible it becomes for sunken protrusions generated by the deformation of carbon black protrusions to be supported by point contact by hard protrusions. Thus, this difference is desirably equal to or lower than 20 nm.

The magnetic recording medium of the present invention will be described in detail below.

(Magnetic Layer)

Examples of the ferromagnetic powder contained in the magnetic layer in the magnetic recording medium of the present invention are hexagonal ferrite powder and ferromagnetic metal powder.

The average particle size of the ferromagnetic powder can be measured by the following method.

The particles of ferromagnetic powder are photographed at a magnification of about 100,000-fold with a model H-9000 transmission electron microscope made by Hitachi and printed on photographic paper at a total magnification of about 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured. The average value of the particle size measured by the above method can be applied as the average particle size of the ferromagnetic powder.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter). In the measurement of powder size, the standard deviation/average value, expressed as a percentage, is defined as the coefficient of variation.

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The average plate diameter of hexagonal ferrite preferably ranges from 10 to 100 nm, more preferably 10 to 60 nm, further preferably 10 to 50 nm. Particularly when employing an MR head in reproduction to increase a track density, a plate diameter equal to or less than 40 nm is desirable to reduce noise. An average plate diameter equal to or higher than 10 nm can yield stable magnetization without the effects of thermal fluctuation. An average plate diameter equal to or less than 100 nm can permit low noise and is suited to the high-density magnetic recording. The plate ratio (plate diameter/plate thickness) of the hexagonal ferrite powder preferably ranges from 1 to 15, more preferably from 1 to 7. Low plate ratio is preferable to achieve high filling property of the magnetic layer, but some times adequate orientation is not achieved. When the plate ratio is higher than 15, noise may be increased due to stacking between particles. The specific surface area by BET method of the hexagonal ferrite powders having such particle sizes ranges from 10 to 100 m$^2$/g, almost corresponding to an arithmetic value from the particle plate diameter and the plate thickness. Narrow distributions of particle plate diameter and thickness are normally good. Although difficult to render in number form, about 500 particles can be randomly measured in a transmission electron microscope (TEM) photograph of particles to make a comparison. This distribution is often not a normal distribution. However, when expressed as the standard deviation to the average particle size, sigma/average particle size=0.1 to 2.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (Hc) of the hexagonal ferrite powder of about 500 to 5,000 Oe, approximately 40 to 398 kA/m, can normally be achieved. A high coercivity (Hc) is advantageous for high-density recording, but this is limited by the capacity of the recording head. The hexagonal ferrite powder employed in the present invention preferably has a coercivity (Hc) ranging from 2,000 to 4,000 Oe, approximately 160 to 320 kA/m, more preferably 2,200 to 3,500 Oe, approximately 176 to 280 kA/m. When the saturation magnetization of the head exceeds 1.4 tesla, the hexagonal ferrite having a coercivity (Hc) of equal to or higher than 2,200 Oe (176 kA/m) is preferably employed. The coercivity (Hc) can be controlled by particle size (plate diameter and plate thickness), the types and quantities of elements contained, substitution sites of the element, the particle producing reaction conditions, and the like. The saturation magnetization ($\sigma_s$) can be 40 to 80 A·m$^2$/kg. The higher saturation magnetization ($\sigma_s$) is preferred, however, it tends to decrease with decreasing particle size. Known methods of improving saturation magnetization ($\sigma_s$) are combining spinel ferrite with magnetoplumbite ferrite, selection of the type and quantity of elements incorporated, and the like. It is also possible to employ W-type hexagonal ferrite. When dispersing the hexagonal ferrite powder, the surface of the hexagonal ferrite powder can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added can range from 0.1 to 10 weight percent relative to the weight of the hexagonal ferrite powder. The pH of the hexagonal ferrite powder is also important to dispersion. A pH of about 4 to 12 is usually optimum for the dispersion medium and polymer. From the perspective of the chemical stability and storage properties of the medium, a pH of about 6 to 11 can be selected. Moisture contained in the hexagonal ferrite powder also affects dispersion. There is an optimum level for the dispersion medium and polymer, usually selected from the range of 0.01 to 2.0 weight percent. Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention.

The ferromagnetic metal powder employed in the magnetic layer is not specifically limited, but preferably a ferromagnetic metal power comprised primarily of a-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, incorporation of at least one of the following in addition to α-Fe is desirable: Al, Si, Ca, Y, Ba, La, Nd, Co, Ni, and B. Incorporation of at least one selected from the group consisting of Co, Y and Al is particularly preferred. The Co content preferably ranges from 0 to 40 atom percent, more preferably from 15 to 35 atom percent, further preferably from 20 to 35 atom percent with respect to Fe. The content of Y preferably ranges from 1.5 to 12 atom percent, more preferably from 3 to 10 atom percent, further preferably from 4 to 9 atom percent with respect to Fe. The Al content preferably ranges from 1.5 to 12 atom percent, more preferably from 3 to 10 atom percent, further preferably from 4 to 9 atom percent with respect to Fe.

These ferromagnetic metal powders may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014, which are expressly incorporated herein by reference in their entirety.

The ferromagnetic metal powder may contain a small quantity of hydroxide or oxide. Ferromagnetic metal powders obtained by known manufacturing methods may be employed. The following are examples of methods of manufacturing ferromagnetic metal powders: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. Any one from among the known method of slow oxidation, that is, immersing the ferromagnetic metal powder thus obtained in an organic solvent and drying it; the method of immersing the ferromagnetic metal powder in an organic solvent, feeding in an oxygen-containing gas to form a surface oxide film, and then conducting drying; and the method of adjusting the partial pressures of oxygen gas and an inert gas without employing an organic solvent to form a surface oxide film, may be employed.

The specific surface area by BET method of the ferromagnetic metal powder employed in the magnetic layer is preferably 45 to 100 $m^2/g$, more preferably 50 to 80 $m^2/g$. At 45 $m^2/g$ and above, low noise is achieved. At 100 $m^2/g$ and below, good surface properties are achieved. The crystallite size of the ferromagnetic metal powder is preferably 80 to 180 Angstroms, more preferably 100 to 180 Angstroms, and still more preferably, 110 to 175 Angstroms. The major axis length of the ferromagnetic metal powder is preferably equal to or greater than 0.01 μm and equal to or less than 0.15 μm, more preferably equal to or greater than 0.02 μm and equal to or less than 0.15 μm, and still more preferably, equal to or greater than 0.03 μm and equal to or less than 0.12 μm. The acicular ratio of the ferromagnetic metal powder is preferably equal to or greater than 3 and equal to or less than 15, more preferably equal to or greater than 5 and equal to or less than 12. The $\sigma_s$ of the ferromagnetic metal powder is preferably 100 to 180 A·$m^2$/kg, more preferably 110 to 170 A·$m^2$/kg, and still more preferably, 125 to 160 A·$m^2$/kg. The coercivity of the ferromagnetic powder is preferably 2,000 to 3,500 Oe, approximately 160 to 280 kA/m, more preferably 2,200 to 3,000 Oe, approximately 176 to 240 kA/m.

The moisture content and pH of the ferromagnetic metal powder is desirably optimized depending on the type of binder combined. The moisture content of the ferromagnetic metal powder is desirably 0.01 to 2 percent. A range of pH 4 to 12 can be established, with 6 to 10 being preferred. As needed, the ferromagnetic metal powder can be surface treated with Al, Si, P, or an oxide thereof. The quantity can be set to 0.1 to 10 weight percent of the ferromagnetic metal powder. When applying a surface treatment, the quantity of a lubricant such as a fatty acid that is adsorbed is desirably not greater than 100 mg/$m^2$. The ferromagnetic metal powder will sometimes contain inorganic ions such as soluble Na, Ca, Fe, Ni, or Sr. These are desirably substantially not present, but seldom affect characteristics at 200 ppm or less. The ferromagnetic metal powder employed in the present invention desirably has few voids; the level is preferably 20 volume percent or less, more preferably 5 volume percent or less. As stated above, so long as the particle size characteristics are satisfied, the ferromagnetic metal powder may be acicular, rice grain-shaped, or spindle-shaped. The SFD of the ferromagnetic metal powder itself is desirably low, with 0.8 or less being preferred. The Hc distribution of the ferromagnetic metal powder is desirably kept low. When the SFD is 0.8 or lower, good electromagnetic characteristics are achieved, output is high, and magnetic inversion is sharp, with little peak shifting, in a manner suited to high-density digital magnetic recording. To keep the Hc low, the methods of improving the particle size distribution of goethite in the ferromagnetic metal powder and preventing sintering may be employed.

(Nonmagnetic Layer)

The magnetic recording medium of the present invention can comprise a nonmagnetic layer comprising a nonmagnetic powder and a binder. The nonmagnetic powder comprised in the nonmagnetic layer can be selected from inorganic compounds such as metal oxides, metal carbonates, metal sulfates, metal nitrides, metal carbides, metal sulfides and the like. Examples of inorganic compounds are alpha-alumina having an α-conversion rate of 90 to 100 percent, β-alumina, γ-alumina, silicon carbide, chromium oxide, cerium oxide, α-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate and molybdenum disulfide; these may be employed singly or in combination. Particularly desirable are titanium dioxide, zinc oxide, iron oxide and barium sulfate due to their narrow particle distribution and numerous means of imparting functions. Even more preferred is titanium dioxide and α-iron oxide. The average particle diameter of these nonmagnetic powders preferably ranges from 0.005 to 2 μm, but nonmagnetic powders of differing particle size may be combined as needed, or the particle diameter distribution of a single nonmagnetic powder may be broadened to achieve the same effect. What is preferred most is an average particle diameter in the nonmagnetic powder ranging from 0.01 to 0.2 μm. Particularly when the nonmagnetic powder is a granular metal oxide, an average particle diameter equal to or less than 0.08 μm is preferred, and when an acicular metal oxide, the average major axis length is preferably equal to or less than 0.3 μm, more preferably equal to or less than 0.2 μm. The tap density preferably ranges from 0.05 to 2 g/ml, more preferably from 0.2 to 1.5 g/ml. The moisture content of the nonmagnetic powder preferably ranges from 0.1 to 5 weight percent, more preferably from 0.2 to 3 weight percent, further preferably from 0.3 to 1.5 weight percent. The pH of the nonmagnetic powder preferably ranges from 2 to 11, and the pH between 5.5 to 10 is particular preferred.

The specific surface area of the nonmagnetic powder preferably ranges from 1 to 100 $m^2/g$, more preferably from 5 to 80 $m^2/g$, further preferably from 10 to 70 $m^2/g$. The crystallite size of the nonmagnetic powder preferably ranges from 0.004 μm to 1 μm, further preferably from 0.04 μm to 0.1 μm. The oil absorption capacity using dibutyl phthalate (DBP) preferably ranges from 5 to 100 ml/100 g, more preferably from 10 to 80 ml/100 g, further preferably from 20 to 60 ml/100 g. The specific gravity preferably ranges from 1 to 12, more preferably from 3 to 6. The shape of the nonmagnetic powder may be any of acicular, spherical, polyhedral, or plate-shaped. The nonmagnetic powder having a Mohs' hardness ranging from 4 to 10 is preferred. The stearic acid (SA) adsorption capacity of the nonmagnetic powder preferably ranges from 1 to 20 micromol/m², more preferably from 2 to 15 micromol/m², further preferably from 3 to 8 micromol/m². The pH of the nonmagnetic powder preferably ranges from 3 to 6. The surface of these nonmagnetic powders is preferably treated with $Al_2O_3$, $SiO_2$, $TiO_2$, $ZrO_2$, $SnO_2$, $Sb_2O_3$, $ZnO$ and $Y_2O_3$. The surface-treating agents of preference with regard to dispersibility are $Al_2O_3$, $SiO_2$, $TiO_2$ and $ZrO_2$, and $Al_2O_3$, $SiO_2$ and $ZrO_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders are: Nanotite from Showa Denko K. K.; HIT-100 and ZA-G 1 from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and $TiO_2P25$ from Nippon Aerogil; 100A and 500A from Ube Industries, Ltd.; and sintered products of the same. Particular preferable nonmagnetic powders are titanium dioxide and α-iron oxide.

Based on the objective, an organic powder may be added to the nonmagnetic layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827, which are expressly incorporated herein by reference in their entirety, may be employed.
(Binder)

Conventionally known thermoplastic resins, thermosetting resins, reactive resins, and mixtures of the same can be employed as the binder in the magnetic layer and the nonmagnetic layer. A thermoplastic resin having a glass transition temperature of −100 to 150° C., a number average molecular weight of 1,000 to 200,000, desirably 10,000 to 100,000, and a degree of polymerization of about 50 to 1,000 can be employed. Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten. It is also possible to employ known electron beam-cured resins in each layer. Examples and manufacturing methods of such resins are described in Japanese Unexamined Patent Publication (KOKAI) Showa No. 62-256219. The contents of the above publications are expressly incorporated herein by reference in their entirety. The above-listed resins may be used singly or in combination. As described above, the surface property of the magnetic layer can be controlled by employing a radiation-curing resin as binder in the nonmagnetic layer.

The above-listed resins may be used singly or in combination, and preferred resins are combinations of polyurethane resin and at least one member selected from the group consisting of vinyl chloride resin, vinyl chloride-vinyl acetate copolymers, vinyl chloride-vinyl acetate-vinyl alcohol copolymers, and vinyl chloride-vinyl acetate-maleic anhydride copolymers, as well as combinations of the same with polyisocyanate. Among these, vinyl chloride binder and polyurethane binder are preferred. As a polyurethane resin, polyester polyurethane, polyether polyurethane, polycarbonate polyurethane, polyether polyester polyurethane, acrylic polyurethane and the like can be employed.

A binder obtained by incorporating as needed one or more polar groups selected from among —COOM, —$SO_3M$, —$OSO_3M$, —P═$O(OM)_2$, and —O—P═$O(OM)_2$ (where M denotes a hydrogen atom or an alkali metal base), —OH, —$NR_2$, —$N^+R_3$ (where R denotes a hydrocarbon group), epoxy group, —SH, and —CN into any of the above-listed binders by copolymerization or addition reaction to improve dispersion properties and durability is desirably employed. The quantity of such a polar group ranges from, for example, $10^{-1}$ to $10^{-8}$ mol/g, preferably from $10^{-2}$ to $10^{-6}$ mol/g. These binders can be synthesized by known methods, and can be obtained by incorporating, as needed, a suitable amount of polar group into commercialized products.

Polyisocyanate is normally employed as a curing agent. Examples of polyisocyanates are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. They can be used in each layer singly or in combinations of two or more by exploiting differences in curing reactivity. The curing agents employed in the present invention are commercially available.

The content of binder, including curing agent, in the magnetic layer desirably ranges from 10 to 25 weight parts per 100 weight parts of ferromagnetic powder. The content of binder, including curing agent, in the nonmagnetic layer desirably ranges from 25 to 40 weight parts per 100 weight parts of nonmagnetic powder.
(Carbon Black)

The magnetic recording medium of the present invention comprises carbon black in at least the magnetic layer, and may comprise carbon black in the nonmagnetic layer. Examples of types of carbon black that are suitable for use are: furnace black for rubber, thermal for rubber, black for coloring, and acetylene black. It is preferable that the specific surface area is 5 to 500 m²/g, the DBP oil absorption capacity is 10 to 400 ml/100 g, the pH is 2 to 10, the moisture content is 0.1 to 10 weight percent, and the tap density is 0.1 to 1 g/ml. Specific examples of carbon black are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Ketjen Black International Co., Ltd. The carbon black employed may be surface-treated with a dispersant or grafted with resin, or have a partially graphite-treated surface. These carbon blacks may be used singly or in combination. The average particle diameter and quantity added of the carbon black employed in the magnetic layer are as set forth above. The average primary particle diameter of the carbon black in the nonmagnetic layer is, for example, 5 to 300 nm, desirably 10 to 250 nm, and preferably, 20 to 200 nm. The quantity added is desirably 0.1 to 30 weight percent of the nonmagnetic powder. Carbon blacks that can be employed in the magnetic layer and/or nonmagnetic layer in the present invention can be determined by referencing, for example, the "Carbon Black Handbook" compiled by the Carbon Black Association of Japan.

(Abrasive)

The above-described hard substances are examples of the abrasives contained in the magnetic layer. These abrasives can also be added to the nonmagnetic layer as needed. Their addition to the nonmagnetic layer can control the surface topography and control the state of protrusion of abrasive. The particle diameter and quantity of abrasive added to the magnetic layer and nonmagnetic layer are naturally set to optimal levels.

(Additives)

Substances having lubricating effects, antistatic effects, dispersive effects, plasticizing effects, or the like may be employed as additives in the magnetic layer and nonmagnetic layer. Examples of additives are: molybdenum disulfide, tungsten disulfide, graphite, boron nitride, graphite fluoride, silicone oil, polar group-comprising silicone, fatty acid-modified silicone, fluorosilicone, fluoroalcohols, fluoroesters, polyolefin, polyglycol, polyphenyl ether, phenyl phosphonic acid, benzyl phosphonic acid, phenethyl phosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, other aromatic ring-comprising organic phosphonic acids, alkali metal salts thereof, octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, other alkyl phosphonoic acid, alkali metal salts thereof, phenyl phosphoric acid, benzyl phosphoric acid, phenethyl phosphoric acid, α-methylbenzylphosphoric acid, 1-methyl-1-phenethylphosphoric acid, diphenylmethylphosphoric acid, diphenyl phosphoric acid, benzylphenyl phosphoric acid, α-cumyl phosphoric acid, toluyl phosphoric acid, xylyl phosphoric acid, ethylphenyl phosphoric acid, cumenyl phosphoric acid, propylphenyl phosphoric acid, butylphenyl phosphoric acid, heptylphenyl phosphoric acid, octylphenyl phosphoric acid, nonylphenyl phosphoric acid, other aromatic phosphoric esters, alkali metal salts thereof, octyl phosphoric acid, 2-ethylhexylphosphoric acid, isooctyl phosphoric acid, isononyl phosphoric acid, isodecyl phosphoric acid, isoundecyl phosphoric acid, isododecyl phosphoric acid, isohexadecyl phosphoric acid, isooctyldecyl phosphoric acid, isoeicosyl phosphoric acid, other alkyl ester phosphoric acids, alkali metal salts thereof, alkylsulfonic acid ester, alkali metal salts thereof, fluorine-containing alkyl sulfuric acid esters, alkali metal salts thereof, lauric acid, myristic acid, palmitic acid, stearic acid, behenic acid, butyl stearate, oleic acid, linolic acid, linoleic acid, elaidic acid, erucic acid, other monobasic fatty acids comprising 10 to 24 carbon atoms (which may contain an unsaturated bond or be branched), metal salts thereof, butyl stearate, octyl stearate, amyl stearate, isooctyl stearate, octyl myristate, butyl laurate, butoxyethyl stearate, anhydrosorbitan monostearate, anhydrosorbitan tristearate, other mono-fatty esters, difatty esters, or polyfatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched), alkoxyalcohol having 12 to 22 carbon atoms (which may contain an unsaturated bond or be branched) or a monoalkyl ether of an alkylene oxide polymer, fatty acid amides with 2 to 22 carbon atoms, and aliphatic amines with 8 to 22 carbon atoms. Compounds having aralkyl groups, aryl groups, or alkyl groups substituted with groups other than hydrocarbon groups, such as nitro groups, F, Cl, Br, $CF_3$, $CCl_3$, $CBr_3$, and other halogen-containing hydrocarbons in addition to the above hydrocarbon groups, may also be employed.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.), which is expressly incorporated herein by reference in its entirety.

The above-described additives need not be 100 percent pure and may contain impurities, such as isomers, unreacted material, by-products, decomposition products, and oxides in addition to the main components. These impurities are preferably comprised equal to or less than 30 weight percent, and more preferably equal to or less than 10 weight percent.

(Nonmagnetic Support)

A known film, such as a polyester such as polyethylene terephthalate or polyethylene naphthalate; a polyolefin; cellulose triacetate; polycarbonate; polyamide; polyimide; polyamide-imide; polysulfone; aromatic polyamide; or polybenzooxazole can be employed as the nonmagnetic support. A support with a glass transition temperature of equal to or higher than 100° C. is desirably employed. The use of a high-strength support such as a polyethylene naphthalate or aramid is preferred. As needed, a laminated-type support such as that disclosed in Japanese Unexamined Patent Publication (KOKAI) Heisei No. 3-224127, which is expressly incorporated herein by reference in its entirety, can be employed to vary the surface roughness of the magnetic surface and base surface. These supports can be subjected in advance to corona discharge treatment, plasma treatment, adhesion-enhancing treatment, heat treatment, dust removal, and the like.

(Layer Structure)

As for the thickness structure of the magnetic recording medium of the present invention, the thickness of the nonmagnetic support preferably ranges from 3 to 80 µm, more preferably from 3 to 50 µm, further preferably from 3 to 10 µm.

The thickness of the magnetic layer can be optimized based on the saturation magnetization of the head employed, the length of the head gap, and the recording signal band, and is desirably 0.01 to 0.1 µm, and preferably 0.02 to 0.09 µm for high-density recording. The magnetic layer may be divided into two or more layers having different magnetic characteristics, and a known configuration relating to multilayered magnetic layer may be applied.

The thickness of the nonmagnetic layer ranges from, for example, 0.1 to 3.0 µm, preferably 0.3 to 2.0 µm, and more preferably 0.5 to 1.5 µm. The nonmagnetic layer is effective so long as it is substantially nonmagnetic in the magnetic recording medium of the present invention. For example, it exhibits the effect of the present invention even when it comprises impurities or trace amounts of magnetic material that has been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

(Backcoat Layer)

The magnetic recording medium of the present invention may comprise a backcoat layer on the opposite surface of the nonmagnetic support from the surface on which the magnetic layer is present. The backcoat layer desirably comprises carbon black and inorganic powder. The formula of the magnetic layer or nonmagnetic layer may be applied for the binder and various additives. Application of the above-described formula of the nonmagnetic layer is suitable. The thickness of the backcoat layer is desirably equal to or less than 0.9 µm, preferably 0.1 to 0.7 µm.

(Manufacturing Method)

The process for manufacturing coating compositions for various layers normally comprise a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the ferromagnetic powder or nonmagnetic powder and all or part of the binder (preferably equal to or higher than 30 weight percent of the entire quantity of binder) can be kneaded in a range of 15 to 500 parts per 100 parts of the ferromagnetic powder. Details of the kneading process are described in Japanese Unexamined Patent Publication (KOKAI) Heisei Nos. 1-106338 and 1-79274, which are expressly incorporated herein by reference in their entirety. Further, glass beads may be employed to disperse the coating compositions for magnetic and nonmagnetic layers, with a dispersing medium with a high specific gravity such as zirconia beads, titania beads, and steel beads being suitable for use. As described above, zirconia beads are particularly preferred. The particle diameter and fill ratio of these dispersing media, and other dispersion conditions are as set forth above. A known dispersing device may be employed.

As set forth above, when coating a magnetic recording medium of multilayer configuration in the present invention, a wet-on-dry method is preferably employed, in which a coating composition for forming a nonmagnetic layer is coated on the nonmagnetic support and dried to form a nonmagnetic layer, and then a coating composition for forming a magnetic layer is coated on the nonmagnetic layer and dried.

When using a wet-on-wet method in which a coating composition for forming a nonmagnetic layer is coated, and while this coating is still wet, a coating composition for forming a magnetic layer is coated thereover and dried, the following methods are desirably employed;

(1) a method in which the nonmagnetic layer is first coated with a coating device commonly employed to coat magnetic coating materials such as a gravure coating, roll coating, blade coating, or extrusion coating device, and the magnetic layer is coated while the nonmagnetic layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672, which are expressly incorporated herein by reference in their entirety;

(2) a method in which the upper and lower layers are coated nearly simultaneously by a single coating head having two built-in slits for passing coating composition, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672, which are expressly incorporated herein by reference in their entirety; and (3) a method in which the upper and lower layers are coated nearly simultaneously using an extrusion coating apparatus with a backup roller as disclosed in Japanese Unexamined Patent Publication (KOKAI) Heisei No. 2-174965, which is expressly incorporated herein by reference in its entirety. To avoid deteriorating the electromagnetic characteristics or the like of the magnetic recording medium by aggregation of magnetic particles, shear is desirably imparted to the coating composition in the coating head by a method such as disclosed in Japanese Unexamined Patent Publication (KOKAI) Showa No. 62-95174 or Japanese Unexamined Patent Publication (KOKAI) Heisei No. 1-236968, which are expressly incorporated herein by reference in their entirety. To prevent a decrease in the electromagnetic characteristics and the like of the magnetic recording medium due to the aggregation of magnetic powders, it is desirable to impart a shear to the coating composition within the coating head by a method such as that disclosed in Japanese Unexamined Patent Publication (KOKAI) Showa No. 62-95174 or Heisei No. 1-236968. The viscosity of the coating composition is desirably optimally adjusted for various methods, such as the wet-on-dry coating method and the wet-on-wet coating method.

Coating of coating composition for each layer can be carried out with a coating device commonly employed to coat magnetic coating materials such as a gravure coating, roll coating, blade coating, or extrusion coating device.

When it is a magnetic tape, the coating layer that is formed by applying the magnetic coating composition can be magnetic field orientation processed using cobalt magnets or solenoids on the ferromagnetic powder contained in the coating layer. When it is a disk, an adequately isotropic orientation can be achieved in some products without orientation using an orientation device, but the use of a known random orientation device in which cobalt magnets are alternately arranged diagonally, or alternating fields are applied by solenoids, is desirable. In the case of ferromagnetic metal powder, the term "isotropic orientation" generally refers to a two-dimensional in-plane random orientation, which is desirable, but can refer to a three-dimensional random orientation achieved by imparting a perpendicular component. Further, a known method, such as opposing magnets of opposite poles, can be employed to effect perpendicular orientation, thereby imparting an isotropic magnetic characteristic in the peripheral direction. Perpendicular orientation is particularly desirable when conducting high-density recording. Spin coating can be used to effect peripheral orientation.

After the above-described coating and drying, the magnetic recording medium is normally subjected to calendering. The details of the calendering are as set forth above. As stated above, the surface of the magnetic layer may be surface treated.

The magnetic recording medium obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like are suitably selected.

Physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

In the magnetic recording medium of the present invention, the surface roughness of the magnetic layer, denoted as the surface roughness Ra as measured by an atomic force microscope, is desirably equal to or lower than 3.0 nm, preferably equal to or lower than 2.8 nm, and more preferably, equal to or lower than 2.7 nm from the perspective of reducing the spacing. From the perspective of ensuring running performance, the lower limit is desirably equal to or greater than 0.5 nm, preferably equal to or greater than 0.6 nm, and more preferably, equal to or greater than 0.7 nm. The average roughness Ra of the surface of the magnetic layer can be a value obtained by measuring an area of about 5 μm square (5 μm×5 μm) to about 100 μm square (100×100 μm) of the surface of the magnetic layer by an atomic force microscope. For example, the Ra can be calculated for a 30 μm square (30 μm×30 μm) within a measured area of 40 μm square (40 μm×40 μm).

A magnetic recording and reproduction system that reproduces a signal recorded at high density with a giant magneto resistive (GMR) head is desirable as the magnetic signal reproduction system employing the magnetic recording medium of the present invention. Since GMR heads are highly sensitive, they also tend to detect noise with high sensitivity. Conventionally, it has been difficult to achieve good S/N ratios. By contrast, since the surface of the magnetic recording medium of the present invention is highly smooth, with a magnetic layer surface that is essentially free of protrusions exceeding 40 nm in height, the reduction in medium noise makes it possible to achieve an improved S/N ratio in reproduction with GMR heads.

The gap between two shields(sh-sh) of the GMR head in the above magnetic signal reproduction system is, for example, 0.08 to 0.18 μm. The reproduction track width is, for example, 0.3 to 3.5 μm. An MR head utilizes the electro resistive effect in response to the magnitude of the magnetic flux in a thin-film magnetic head, affording the advantage of high reproduction outputs that are unachievable with inductive heads. This is primarily because there is no dependence on the speed of the medium relative to the head, since the reproduction output of an MR head is based on a change in magnetic resistance. In particular, GMR heads have higher reading sensitivity than anisotropic magneto resistive (AMR) heads. The use of such a GMR head as the reproduction head permits the reproduction with high sensitivity of signals recorded at high density. When the magnetic recording medium of the present invention is a tape-like magnetic recording medium, the use of a GMR head as the reproduction head permits reproduction at a high S/N ratio, even when the signal has been recorded in a higher frequency region than is conventionally the case. Accordingly, the magnetic recording medium of the present invention is optimal as a magnetic tape or disk-shaped magnetic recording medium for the high density recording of computer data.

EXAMPLES

The present invention will be described in detail below based on examples. However, the present invention is not limited to the examples. The term "parts" given in Examples are weight parts unless specifically stated otherwise.

Example 1

| Magnetic coating composition | |
|---|---|
| (Magnetic coating composition) | |
| Barium ferrite magnetic powder: | 100 parts |
| (Hc: 2100 Oe (168 kA/m), average particle size: 25 nm) | |
| Sulfonic acid group-containing polyurethane resin: | 15 parts |
| Cyclohexanone: | 150 parts |
| Methyl ethyl ketone: | 150 parts |
| (Liquid containing dispersed abrasive powders) | |
| α-Alumina (average primary particle diameter: 110 nm): | 9.0 parts |
| Vinyl chloride copolymer | 0.7 parts |
| (MR110 made by Zeon Corporation): | |
| Cyclohexanone: | 20 parts |
| (Liquid containing dispersed carbon black powders) | |
| Carbon black (average primary particle diameter 80 nm): | 0.5 parts |
| Cyclohexanone: | 2 parts |
| (Other components) | |
| Butyl stearate: | 1 part |
| Stearic acid: | 1 part |
| Polyisocyanate | 2.5 parts |
| (Coronate made by Nippon Polyurethane Industry Co., Ltd.): | |

-continued (Solvents added for finishing)

| | |
|---|---|
| Cyclohexanone: | 180 parts |
| Methyl ethyl ketone: | 180 parts |
| Nonmagnetic coating composition | |
| Nonmagnetic inorganic powder (α-iron oxide): (Particle size: 0.15 µm, average acicular ratio: 7, BET specific surface are: 52 m²/g) | 80 parts |
| Carbon black (average primary particle diameter 20 nm): | 20 parts |
| Sulfonic acid group-containing vinyl chloride copolymer: | 13 parts |
| Sulfonic acid group-containing polyurethane resin: | 6 parts |
| Phenyl phosphonic acid: | 3 parts |
| Cyclohexanone: | 140 parts |
| Methyl ethyl ketone: | 170 parts |
| Butyl stearate: | 2 parts |
| Stearic acid: | 1 part |
| Polyisocyanate (Coronate made by Nippon Polyurethane Industry Co., Ltd.): | 5 parts |
| Backcoat coating composition | |
| Nonmagnetic inorganic powder (α-iron oxide): (Particle size: 0.15 µm, average acicular ratio: 7, BET specific surface are: 52 m²/g) | 80 parts |
| Carbon black (average primary particle diameter 20 nm): | 20 parts |
| Carbon black (average primary particle diameter 100 nm): | 3 parts |
| Vinyl chloride copolymer: | 13 parts |
| Sulfonic acid group-containing polyurethane resin: | 6 parts |
| Phenyl sulfonic acid: | 3 parts |
| Cyclohexanone: | 140 parts |
| Methyl ethyl ketone: | 170 parts |
| Stearic acid: | 3 parts |
| Polyisocyanate (Coronate made by Nippon Polyurethane Industry Co., Ltd.): | 5 parts |
| Methyl ethyl ketone: | 400 parts |

The magnetic coating composition was kneaded and diluted in an open kneader. Then, with a horizontal bead mill disperser, using zirconia (ZrO₂) beads (referred to as "Zr beads" hereinafter) 0.5 mm in particle diameter at a bead fill rate of 80 percent, a rotor tip peripheral speed of 10 m/s, and a single pass retention time of two minutes, 12 passes of dispersion processing were conducted.

The liquid containing dispersed carbon black powders was prepared by the following method. The carbon black powders and cyclohexanone were liquefied by being processed for 30 minutes in a batch-type ultrasonic disperser equipped with stirrer at a stirring rotational speed of 1,500 rpm. With a horizontal bead mill disperser, using Zr beads 0.5 mm in particle diameter at a bead fill rate of 80 percent, a rotor tip peripheral speed of 10 m/s, and a single pass retention time of two minutes, the liquefied carbon black powders were subjected to 6 passes of dispersion processing. The liquid was stirred for 30 minutes in a dissolver stirrer at a peripheral speed of 10 m/s, and then subjected to 3 passes of processing in a flow-type ultrasonic disperser at a flow rate of 3 kg/min.

The liquid containing dispersed abrasive powders was prepared as a 90:7:200 (weight ratio) mixture of alumina:vinyl chloride copolymer (MR110 made by Zeon Corporation):cyclohexanone, charged with Zr beads 1 mm in particle diameter to a vertical sand mill disperser, and adjusted to 60 percent bead volume/(volume of the liquid containing dispersed abrasive powders+bead volume). Sand mill dispersion processing was conducted for 180 minutes. Following this processing, the liquid was removed and subjected to ultrasonic dispersion filtration with a flow-type ultrasonic dispersion and filtration device.

The magnetic coating composition, liquid containing dispersed carbon black powders, and liquid containing dispersed abrasive powders were introduced along with other components in the form of lubricants, a curing agent, and solvents added for finishing into a dissolver stirrer, stirred for 30 minutes at a peripheral speed of 10 m/s, subjected to 3 passes at a flow rate of 7.5 kg/min in a flow-type ultrasonic disperser, and passed through a 1 µm filter to prepare a magnetic coating composition.

The nonmagnetic coating composition was prepared by the following method.

Excluding lubricants (butyl stearate, stearic acid) and polyisocyanate, the above components were kneaded and diluted in an open kneader. Subsequently, they were subjected to dispersion processing in a horizontal bead mill disperser. The lubricants (butyl stearate, stearic acid) and polyisocyanate were then added and the mixture was stirred and mixed in a dissolver stirrer to prepare a nonmagnetic coating composition.

The backcoat coating composition was prepared by the following method.

Excluding the lubricant (stearic acid), polyisocyanate, and methyl ethyl ketone (400 parts), the above components were kneaded and diluted in an open kneader. Subsequently, they were dispersion processed in a horizontal bead mill disperser. The lubricant (stearic acid), polyisocyanate, and methyl ethyl ketone (400 parts) were then added and the mixture was stirred and mixed in a dissolver stirrer to prepare a backcoat coating composition.

The nonmagnetic coating composition was coated and dried to a dry thickness of 1.0 µm on a polyethylene naphthalate support 6 µm in thickness. Subsequently, the backcoat coating composition was coated and dried to a dry thickness of 0.5 µm on the opposite surface of the support. The support was wound up and then heat treated for 36 hours in a 70° C. dry environment.

The magnetic coating composition was coated and dried to a dry thickness of 0.08 µm on the nonmagnetic layer following the heat treatment.

Subsequently, a surface smoothing treatment was conducted at a temperature of 100° C., a linear pressure of 300 kg/cm (294 kN/m), and a speed of 40 m/min with a calender comprised solely of metal rolls. A heat treatment was then conducted for 36 hours in a 70° C. dry environment. Following the heat treatment, the medium was slit into a ½ inch width. The surface of the magnetic layer was cleaned with a tape cleaning device by mounting it on a device equipped with slit product feeding and winding devices so that a nonwoven fabric and razor blade contacted with a magnetic surface, yielding a tape sample.

Example 2

The nonmagnetic coating composition was coated and dried to a dry thickness of 1.5 µm, after which the magnetic coating composition was coated and dried to a dry thickness of 0.08 µm. The backcoat coating composition was coated and dried to a dry thickness of 0.5 µm on the opposite surface of the support. Subsequently, surface smoothing processing was conducted at a temperature of 90° C. at a linear pressure of 300 kg/cm (294 kN/m) and at a rate of 80 m/min with a calender comprised solely of metal rolls. With these exceptions, a tape sample was prepared by the same method as in Example 1.

Example 3

The sulfonic acid group-containing vinyl chloride copolymer in the nonmagnetic coating composition was replaced with sulfonic acid group-containing vinyl chloride polymer imparted with functional groups having C=C double bonds, the polyisocyanate (Coronate made by Nippon Polyurethane Industry Co., Ltd.) was replaced with dipentaerythritol hexaacrylate (DPHA) (Kayarad DPHA, made by Nippon Kayaku Co., Ltd.) and a liquid was prepared.

The nonmagnetic coating composition was coated and dried to a dry thickness of 1.0 μm, and then irradiated with an electron beam at an energy of 40 kGy at an acceleration voltage of 125 kV. The magnetic coating composition was coated and dried thereover to a dry thickness of 0.08 μm, and the backcoat coating composition was coated and dried to a dry thickness of 0.5 μm on the opposite surface of the support. Subsequently, surface smoothing treatment was conducted at a temperature of 100° C. at a linear pressure of 300 kg/cm (294 kN/m) and at a rate of 80 m/min with a calender comprised solely of metal rolls. A heat treatment was then conducted for 36 hours in a 70° C. dry environment. Following the heat treatment, the medium was slit into a ½ inch width. The surface of the magnetic layer was cleaned with a tape cleaning device by mounting it on a device equipped with slit product feeding and winding devices so that a nonwoven fabric and razor blade contacted with a magnetic surface, yielding a tape sample. Next, 180° lapping was conducted with a round rod (4 mm in diameter) made of AlTiC with an Ra of 15 nm as measured for a 40 μm square by AFM and surface processing was conducted by 100 passes back and forth at a rate of 20 mm/s at a tension of 100 g to obtain a tape sample.

Example 4

A metal vessel was charged 120 parts of cyclohexanone. While stirring at a peripheral speed of 10 m/s with a dissolver stirrer, 100 parts of barium ferrite magnetic powder were introduced into the liquid. Dispersion processing was conducted for 30 minutes with an ultrasonic disperser. Subsequently, a liquid comprised of 15 parts of sulfonic acid group-containing polyurethane resin, 30 parts of cyclohexanone, and 150 parts of methyl ethyl ketone was prepared. This liquid was dispersed in a horizontal bead mill in the same manner as in Example 1, and the liquid containing dispersed carbon black powders, the liquid containing dispersed abrasive powders, and other components were admixed to prepare a magnetic coating composition.

The nonmagnetic coating composition was coated and dried to a dry thickness of 1.0 μm on a polyethylene naphthalate support 6 μm in thickness. Subsequently, the magnetic coating composition was coated and dried to a dry thickness of 0.08 μm, and the backcoat coating composition was coated and dried to a dry thickness of 0.5 μm on the opposite surface of the support. With the exception that calendering was then conducted at a temperature of 90° C. at a linear pressure of 300 kg/cm (294 kN/m) at a rate of 80 m/min, a tape sample was prepared by the same method as in Example 1.

Example 5

With the exception that the nonmagnetic coating composition was coated and dried to a dry thickness of 1.0 μm, a tape sample was prepared by the same method as in Example 2.

Example 6

With the exception that the quantity of the liquid containing dispersed abrasive powders in Example 5 was halved, a tape sample was prepared by the same method as in Example 5.

Example 7

The magnetic coating composition was kneaded and diluted in an open kneader, adjusted to a 60 percent bead volume/(volume of the liquid containing dispersed abrasive powders+bead volume) with Zr beads 0.5 mm in particle diameter in a vertical sand mill disperser, and dispersed for 720 minutes in a sand mill.

The liquid containing dispersed carbon black powders was prepared by the following method. The carbon black powders and cyclohexanone were liquefied by processing for 30 minutes at a stirrer rotational speed of 1,200 rpm in a batch-type ultrasonic disperser equipped with stirrer. The liquefied carbon black powders were subjected to 6 passes of dispersion processing at a single pass retention time of two minutes, a rotor tip peripheral speed of 10 m/s, and a bead fill rate of 80 percent using Zr beads 0.5 mm in particle diameter in a horizontal bead mill disperser. The liquid was stirred for 30 minutes at a peripheral speed of 10 m/s in a dissolver stirrer and then subjected to 2 passes of processing at a flow rate of 3 kg/min in a flow-type ultrasonic disperser.

To the magnetic coating composition were introduced the liquid containing dispersed carbon black powders, 9 parts of SiC powder with a particle diameter of 100 nm, and other components in the form of lubricants, a curing agent, and solvents added for finishing. The mixture was dispersed in a sand mill for 15 minutes and filtered through a 1 μm filter to prepare a magnetic coating composition. With these exceptions, a tape sample was prepared by the same method as in Example 4.

Example 8

With the exception that the liquid containing dispersed abrasive powders identical to that in Example 1 was prepared in place of the SiC powder 100 nm in powder diameter and added in identical quantity, a tape sample was prepared by the same method as in Example 7.

Example 9

With the exception that the calendering speed was 40 m/min and the temperature was 100° C., a tape sample was prepared by the same method as in Example 5.

Example 10

With the exception that no surface processing was conducted with a round rod of AlTiC with an Ra of 15 nm, a tape sample was prepared by the same method as in Example 3.

Comparative Example 1

With the exception that the calendering speed was 80 m/min and the temperature was 80° C., a tape sample was prepared by the same method as in Example 1.

Comparative Example 2

With the exceptions that, a liquid obtained by subjecting three parts of diamond powder (average primary particle diameter 80 nm) and 27 parts of cyclohexanone to dispersion for 360 minutes in a vertical sand mill was employed as the liquid containing dispersed abrasive powders in Example 2, and the calendering rate was changed to 40 m/min and the temperature to 100° C., a tape sample was prepared by the same method as in Example 2.

Comparative Example 3

With the exception that the quantities of the liquid containing dispersed carbon black powders and the liquid containing dispersed abrasive powders were doubled, and the calendering temperature was changed to 90° C., a tape sample was prepared by the same method as in Example 10.

Comparative Example 4

With the exception that the liquid containing dispersed carbon black powders was not added, a tape sample was prepared by the same method as in Example 5.

Comparative Example 5

The magnetic coating composition was kneaded and diluted in an open kneader, mixed with the liquid containing dispersed abrasive powders, and then adjusted to 60 percent bead volume/(volume of magnetic coating composition+volume of the liquid containing abrasive powders+bead volume) using Zr beads 0.5 mm in diameter in a vertical sand mill disperser, after which dispersion was conducted in a sand mill for 720 minutes.

liquefied carbon black powders were subjected to 6 passes of dispersion processing. The liquid was stirred for 30 minutes in a dissolver stirrer at a peripheral speed of 10 m/s, and then subjected to 2 passes of processing in a flow-type ultrasonic disperser at a flow rate of 3 kg/min.

Into the magnetic coating composition was introduced the liquid containing dispersed carbon black powders, the lubricants, the curing agent, and solvents added for finishing. The mixture was dispersed for 15 minutes in a sand mill and passed through a 1 μm filter to prepare a magnetic coating composition. With these exceptions, a tape sample was prepared by the same method as in Example 2.

Comparative Example 6

With the exceptions that 3/2 the quantity of the liquid containing dispersed abrasive powders was added without adding the the liquid containing dispersed carbon black powders and the calendering temperature was changed to 80° C., a tape sample was prepared by the same method as in Example 5.

Table 1 below gives the formulas and preparation methods for the above-described Examples and Comparative Examples.

TABLE 1

| | Quantity of carbon black in the magnetic layer | Type and quantity of hard substance [Note] added to the magnetic layer | Calendering (2R) temperature and rate | Dispersion period of the liquid containing abrasive powders | Thickness of nonmagnetic layer |
|---|---|---|---|---|---|
| Example 1 | 0.5 part | Alumina, 9 parts | 100° C., 40 m/min | 180 min. | 1 μm |
| Example 2 | 0.5 part | Alumina, 9 parts | 90° C., 80 m/min | 180 min. | 1.5 μm |
| Example 3 | 0.5 part | Alumina, 9 parts | 100° C., 80 m/min | 180 min. | 1 μm |
| Example 4 | 0.5 part | Alumina, 9 parts | 90° C., 80 m/min | 180 min. | 1 μm |
| Example 5 | 0.5 part | Alumina, 9 parts | 90° C., 80 m/min | 180 min. | 1 μm |
| Example 6 | 0.5 part | Alumina, 4.5 parts | 90° C., 80 m/min | 180 min. | 1 μm |
| Example 7 | 0.5 part | SiC, 9 parts | 90° C., 80 m/min | The liquid containing abrasive powders was simultaneously dispersed with magnetic coating composition. | 1 μm |
| Example 8 | 0.5 part | Alumina, 9 parts | 90° C., 80 m/min | 180 min. | 1 μm |
| Example 9 | 0.5 part | Alumina, 9 parts | 100° C., 40 m/min | 180 min. | 1 μm |
| Example 10 | 0.5 part | Alumina, 9 parts | 100° C., 80 m/min | 180 min. | 1 μm |
| Comp. Ex. 1 | 0.5 part | Alumina, 9 parts | 80° C., 80 m/min | 180 min. | 1 μm |
| Comp. Ex. 2 | None | Diamond, 3 parts | 100° C., 40 m/min | 180 min. | 1.5 μm |
| Comp. Ex. 3 | 1 part | Alumina, 18 parts | 90° C. 80 m/min | 180 min. | 1 μm |
| Comp. Ex. 4 | None | Alumina, 9 parts | 90° C., 80 m/min | 180 min. | 1 μm |
| Comp. Ex. 5 | 0.5 part | Alumina, 9 parts | 90° C., 80 m/min | The liquid containing abrasive powders was simultaneously dispersed with magnetic coating composition. | 1.5 μm |
| Comp. Ex. 6 | None | Alumina, 13.5 parts | 80° C., 80 m/min | 180 min. | 1 μm |

[Note] Mohs' hardness of each hard substance is given below.
Alumina: 9,
SiC: 9,
Diamond: 10

The liquid containing dispersed carbon black powders was prepared by the following method. The carbon black powders and cyclohexanone were liquefied by processing for 30 minutes at a stirring rotational speed of 1,200 rpm in a batch-type ultrasonic disperser equipped with stirrer. With a horizontal bead mill disperser, using Zr beads 0.5 mm in particle diameter at a bead fill rate of 80 percent, a rotor tip peripheral speed of 10 m/s, and a single pass retention time of two minutes, the Evaluation Methods 1. Evaluation of Electromagnetic Characteristics Evaluation was conducted with a ½ inch reel tester to which a head was secured. A head/tape relative speed was set at 4 m/s.

In recording, a MIG head (gap length 0.15 μm, track width 3.0 μm) was employed. The recording current was set to the optimal recording current for each tape.

A reproduction head in the form of a GMR head with an element thickness of 15 nm, a shield gap of 0.1 µm, and a read element width of 1.0 µm was employed.

A signal was recorded at a linear recording density of 180 Kfci. The reproduction signal was measured with a spectrum analyzer made by ShibaSoku Corporation. The ratio of the carrier signal output to the noise integrated over the entire spectral band was adopted as the S/N ratio. The S/N ratio obtained was evaluated based on the following scale.

The S/N ratio of Example 1 was adopted as 0 dB.

A level of equal to or greater than +0.5 dB relative to the S/N ratio of Example 1 was evaluated as ⊚.

A level of equal to or higher than −2.0 dB but lower than +0.5 dB relative to the S/N ratio of Example 1 was evaluated as ◯.

A level of lower than −2.0 dB relative to the S/N ratio of Example 1 was evaluated as X.

2. Evaluation of Friction Characteristics (Sliding Properties)

The tape was lapped at an angle of 180° with a round rod 4 mm in diameter made of AlTiC with an Ra of 15 nm as measured for a 40 µm square by AFM, and slid 45 mm at a rate of 14 mm/s while applying a load of 100 g. The load during the second pass of sliding at the same speed was detected with a load cell, and the coefficient of friction was calculated based on the following equation:

$$\text{Coefficient of friction} = \ln(\text{measured value (g)}/100 \text{ (g)})/\pi.$$

An evaluation was then made based on the following scale:
- Coefficient of friction<0.25 ⊚
- Coefficient of friction<0.3 ◯
- Coefficient of friction<0.4 △
- Coefficient of friction<0.5 X
- Coefficient of friction>0.5 XX 3. Density of Protrusions Equal to or Higher than 15 nm in Height A 40 µm×40 µm region of the tape surface was measured by AFM (Nanoscope 4, made by Veeco Corporation). The scan rate (speed of probe displacement) was 40 µm/s and the resolution was set to 512×512 pixels. Within this region, a 30 µm×30 µm region that excluded markings for observation of single regions was targeted. The number of protrusions with a height above the reference plane of equal to or higher than 15 nm was determined, and the protrusion density (protrusions/µm$^2$) was calculated as the number of protrusions/900.

4. Maximum Protrusion Height

In the measurement of 3. above, the height at which the protrusion density reached equal to or lower than 0.002 protrusion/µm$^2$ was adopted as the maximum protrusion height.

5. Identification of Carbon Black Protrusions and Hard Protrusions

Figure 2:
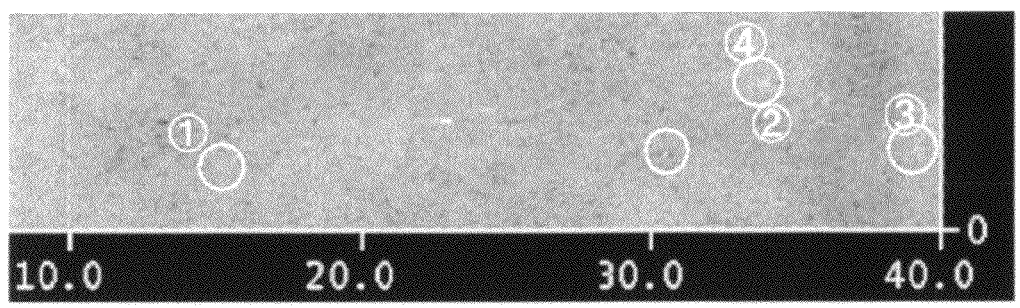
FIG. 2 is a descriptive image (partially enlarged top view taken by AFM) of the method of specifying protrusion-forming components.
Figure 3:
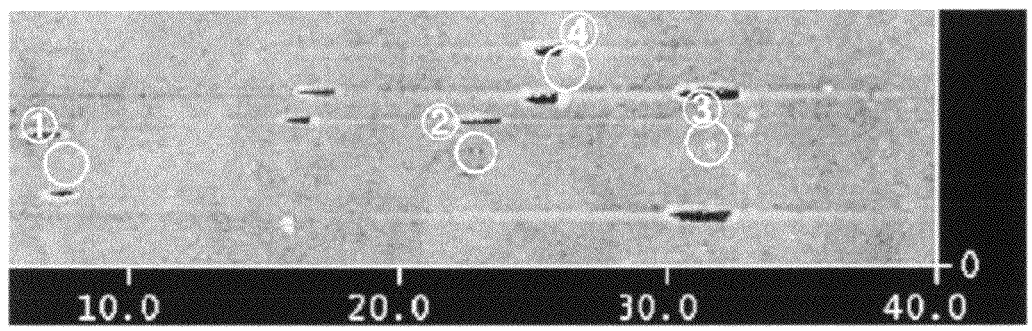
FIG. 3 is a descriptive image (partially enlarged view of marking image taken by AFM) of the method of specifying protrusion-forming components.

In the course of determining the protrusion density in 3. above, special images of regions containing protrusions equal to or higher than 15 nm in height were taken and saved. Top views were also saved. Subsequently, images specifying regions containing protrusions equal to or higher than 15 nm in height were superposed on the top views. An example of these superposed views is shown in FIG. 1. In FIG. 1, the round regions indicated by numbers in circles are regions containing protrusions equal to or higher than 15 nm in height. In the AFM images, the height could be differentiated by black, red, yellow, and white color coding. In the AFM images, one tiny yellow to white dot was contained in each round region. These small dots indicated protrusions equal to or higher than 15 nm in height. FIG. 2 is a partial enlargement containing the round regions denoted as Circles 1 to 4 in FIG. 1. The area around protrusions equal to or higher than 15 nm in height was marked by AFM. FIG. 3 is a partial enlargement of the marking image containing the round regions shown in FIG. 2. When measuring the surface topography by AFM, particularly in a soft sample, observation should be conducted with a probe of optimal hardness and with optical setting conditions to prevent the sample from being scratched with the probe. By adjusting the sample hardness, probe hardness, and settings, it was possible to apply markings around the protrusions to specify their positions. The AFM markings in the Examples and Comparative Examples were made by scanning in contact mode with probes with a hardness of about 5 to 50 N/m using a Nanoscope 4 made by Veeco. In AFM measurement not relating to markings, whether in contact mode or tapping mode, measurements could be made under suitable conditions with a probe of suitable hardness so as not to scratch the surface of the sample. (Contact mode and tapping mode are terms employed in AFM by Veeco Corporation; tapping mode is also sometimes referred to as "noncontact mode" or the like, which is synonymous.)

After completing the markings, a scanning electron microscope was used to enlarge and observe the protrusions that were equal to or higher than 15 nm in height based on the markings, and the composition of the protrusion regions was analyzed by EDS (also referred to as EDX). Those protrusions in which carbon was detected as the chief component and in which Si was not detected were specified as carbon black protrusions. Those protrusions in which Al was detected were specified as hard protrusions formed of alumina. Those protrusions in which Si was detected were specified as hard protrusions formed of SiC. The components of all extracted protrusions equal to or higher than 15 nm in height were analyzed.

Next, in the regions for which the numbers of protrusions equal to or higher than 15 nm in height from the reference plane had been determined in 3. above, the height of the protrusions being measured was changed to equal to or greater than 20 nm and equal to or greater than 25 nm above the reference plane, the numbers of protrusions and their positions were determined, and the height of all protrusions was measured. For example, protrusions that were present at equal to or higher than 15 nm above the reference plane but were not present at equal to or greater than 20 nm above the reference plane were considered to be 15 nm in height. Protrusions that were present at equal to or greater than 20 nm above the reference plane but not at equal to or greater than 25 nm above the reference plane were considered to be 20 nm in height. By using a gradation of less than 5 nm, it was possible to more accurately determine the height of the various protrusions.

These operations made it possible to determine the numbers of protrusions of various heights, the average protrusion height, and the maximum protrusion height for hard protrusions and carbon black protrusions, respectively. In Comparative Example 2, it was not possible to specify protrusion components.

6. Difference in Height Between Carbon Black Protrusions and Hard Protrusions

After isolating hard protrusions and carbon black protrusions equal to or higher than 15 nm in height by the above method, the difference between the height at which the density of hard protrusions reached equal to or lower than 0.002 protrusion/µm$^2$ and the height at which the density of the carbon black protrusions reached equal to or lower than 0.002 protrusion/μm² [(the height at which the density of carbon black protrusions reached equal to or lower than 0.002 protrusion/μm²)−(the height at which the density of hard protrusions reached equal to or lower than 0.002 protrusion/μm²)] was calculated.

7. Magnetic Layer Surface Roughness Ra

The surface roughness Ra was determined for the regions in which protrusions equal to or higher than 15 nm in height had been found in 3. above.

The results of the above are given in Table 2 below.

TABLE 2

| | Protrusions equal to or higher than 15 nm in height | | | | | | |
|---|---|---|---|---|---|---|---|
| | Protrusion density (protrusions/μm²) | Density of hard protrusions (protrusions/μm²) | Density of carbon black protrusions (protrusions/μm²) | Hard protrusions/ carbon black protrusions | Maximum height of hard protrusions (nm) | Maximum height of carbon black protrusions (nm) | Difference between maximun height of carbon black protrusions and that of hard protrusions (nm) |
| Example 1 | 0.166 | 0.081 | 0.085 | 0.95 | 15 | 35 | 20 |
| Example 2 | 0.134 | 0.041 | 0.093 | 0.44 | 20 | 30 | 10 |
| Example 3 | 0.018 | 0.004 | 0.014 | 0.29 | 20 | 25 | 5 |
| Example 4 | 0.155 | 0.084 | 0.071 | 1.18 | 20 | 40 | 20 |
| Example 5 | 0.089 | 0.059 | 0.030 | 1.97 | 20 | 30 | 10 |
| Example 6 | 0.056 | 0.006 | 0.050 | 0.12 | 20 | 30 | 10 |
| Example 7 | 0.076 | 0.001 | 0.075 | 0.01 | 15 | 30 | 15 |
| Example 8 | 0.063 | 0.025 | 0.038 | 0.66 | 20 | 40 | 20 |
| Example 9 | 0.057 | 0.031 | 0.026 | 1.19 | 15 | 35 | 20 |
| Example 10 | 0.086 | 0.039 | 0.047 | 0.83 | 20 | 30 | 10 |
| Comp. Ex. 1 | 0.200 | 0.146 | 0.054 | 2.70 | 25 | 35 | 10 |
| Comp. Ex. 2 | 0.006 | Identification was not possible. | 0.000 | — | 20 | 0 | — |
| Comp. Ex. 3 | 0.205 | 0.085 | 0.120 | 0.71 | 25 | 45 | 20 |
| Comp. Ex. 4 | 0.072 | 0.072 | 0.000 | ∞ | 25 | 0 | — |
| Comp. Ex. 5 | 0.033 | 0.000 | 0.033 | 0 | — | 30 | — |
| Comp. Ex. 6 | 0.064 | 0.064 | 0.000 | ∞ | 40 | 0 | — |

| | Protrisions equal to or higher than 15 nm in height | | | | | | | |
|---|---|---|---|---|---|---|---|---|
| | Average height of hard protrusions (nm) | Average height of carbon black protrusions (nm) | Difference between average height of carbon black protrusions and that of hard protrusions (nm) | Difference between height of carbon black protrusions and that of hard protrusions (nm) | Maximum protrusion height (nm) | Ra of magnetic layer surface (nm) | μ value at 1 pass | Electromagnetic characteristics |
| Example 1 | 15.0 | 22.1 | 7.1 | 20 | 35 | 2.3 | ⊚ | ○ |
| Example 2 | 15.4 | 20.0 | 4.6 | 10 | 30 | 2.3 | ○ | ○ |
| Example 3 | 17.0 | 18.4 | 1.4 | 5 | 25 | 2.2 | ○ | ○ |
| Example 4 | 15.6 | 19.1 | 3.5 | 15 | 40 | 2.8 | ⊚ | ○ |
| Example 5 | 15.9 | 18.2 | 2.3 | 10 | 30 | 2.7 | ○ | ○ |
| Example 6 | 15.7 | 17.8 | 2.1 | 10 | 30 | 2.0 | ○ | ⊚ |
| Example 7 | 15.0 | 17.4 | 2.4 | 20 | 30 | 2.4 | ○ | ⊚ |
| Example 8 | 15.4 | 17.3 | 1.9 | 20 | 40 | 2.7 | ○ | ○ |
| Example 9 | 15.0 | 18.9 | 3.9 | 20 | 35 | 2.5 | ○ | ⊚ |
| Example 10 | 15.9 | 17.6 | 1.7 | 10 | 30 | 2.7 | ⊚ | ○ |
| Comp. Ex. 1 | 17.8 | 21.3 | 3.5 | 10 | 35 | 3.2 | ⊚ | X |
| Comp. Ex. 2 | 0.0 | 0.0 | — | — | 20 | 1.3 | X X | Measurement was not possible. |
| Comp. Ex. 3 | 17.8 | 17.5 | −0.3 | 20 | 45 | 3.4 | ⊚ | X |
| Comp. Ex. 4 | 15.9 | 0.0 | — | — | 25 | 2.5 | Δ~X | ○ |
| Comp. Ex. 5 | 0.0 | 17.3 | — | — | 30 | 2.0 | X | ⊚ |
| Comp. Ex. 6 | 18.7 | 0.0 | — | — | 40 | 2.5 | ⊚ | X |

As shown in Table 2, the magnetic tapes of Examples 1 to 10 all exhibited excellent friction characteristics and electromagnetic characteristics.

By contrast, in Comparative Example 1, there was an excessively large number of protrusions equal to or higher than 15 nm in height. Thus, although friction characteristics were ensured, the spacing became excessively large and the S/N ratio dropped.

In Comparative Example 2, there was an excessively small number of protrusions equal to or higher than 15 nm in height. Thus, the magnetic tape could not be run and the measurement of friction characteristics and electromagnetic characteristics was precluded.

In Comparative Example 3, there was an excessively large number of protrusions equal to or higher than 15 nm in height, with protrusions exceeding 40 nm in height also being present. Thus, friction characteristics were ensured, but the spacing become excessively large and the S/N ratio dropped.

In Comparative Example 4, the friction characteristics deteriorated. This was attributed to the fact that carbon black was not added, resulting in a high initial friction. Additionally, in Comparative Example 5, the friction characteristics decreased. This was attributed to the absence of hard protrusions, resulting in the head contact becoming surface contact. In Comparative Example 5, the reason no hard protrusions were present despite the addition of abrasive was attributed to the abrasive was dispersed with magnetic coating composition, resulting in excessive dispersion or damage to the abrasive.

In Comparative Example 6, a large quantity of abrasive was added, resulting in poor calender molding and a rough magnetic layer surface. Thus, despite good friction characteristics, the electromagnetic characteristics deteriorated.

The above results reveal that by controlling the surface properties of the magnetic layer in the present invention, it was possible to obtain a magnetic recording medium that afforded both excellent electromagnetic characteristics and friction characteristics.

The magnetic recording medium of the present invention is suitable as a tape for computer backups of extremely high density.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium comprising a magnetic layer comprising a ferromagnetic powder and a binder on a nonmagnetic support, wherein
    a height of protrusions with a protrusion density of equal to or lower than 0.002 protrusion/$\mu m^2$ on a surface of the magnetic layer as measured by an atomic force microscope is equal to or lower than 40 nm;
    a density of protrusions that are equal to or higher than 15 nm in height on the surface of the magnetic layer as measured by an atomic force microscope ranges from 0.01 to 0.18 protrusion/$\mu m^2$; and
    the protrusions that are equal to or higher than 15 nm in height include protrusions formed of carbon black and protrusions formed of a substance with a Mohs' hardness exceeding 7, and an average height of the protrusions formed of carbon black is greater than an average height of the protrusions formed of the substance with a Mohs' hardness exceeding 7.

2. The magnetic recording medium according to claim 1, wherein, among the protrusions that are equal to or higher than 15 nm in height, a difference between the average height of the protrusions formed of carbon black and that of the protrusions formed of the substance with a Mohs' hardness exceeding 7 is equal to or greater than 1 nm but equal to or lower than 10 nm.

3. The magnetic recording medium according to claim 1, wherein, among the protrusions that are equal to or higher than 15 nm in height, a density of protrusions formed of carbon black, referred to as "PA", hereinafter, and that of the protrusions formed of the substance with a Mohs' hardness exceeding 7, referred to as "PB", hereinafter, satisfy a relation of $0.01 \leq PB/PA \leq 2.0$.

4. The magnetic recording medium according to claim 1, wherein the magnetic layer has an average surface roughness, Ra, as measured by an atomic force microscope, of equal to or greater than 0.5 nm but equal to or lower than 3.0 nm.

5. The magnetic recording medium according to claim 1, wherein the substance with a Mohs' hardness exceeding 7 is alumina or silicon carbide.

6. The magnetic recording medium according to claim 1, wherein the magnetic layer has a thickness ranging from 0.01 to 0.1 $\mu m$.

7. The magnetic recording medium according to claim 1, wherein the ferromagnetic powder is a hexagonal ferrite powder.

8. A magnetic signal reproduction system comprising a magnetic recording medium and a reproduction head, wherein
    the magnetic recording medium comprises a magnetic layer comprising a ferromagnetic powder and a binder on a nonmagnetic support, wherein
    a height of protrusions with a protrusion density of equal to or lower than 0.002 protrusion/$\mu m^2$ on a surface of the magnetic layer as measured by an atomic force microscope is equal to or lower than 40 nm;
    a density of protrusions that are equal to or higher than 15 nm in height on the surface of the magnetic layer as measured by an atomic force microscope ranges from 0.01 to 0.18 protrusion/$\mu m^2$; and
    the protrusions that are equal to or higher than 15 nm in height include protrusions formed of carbon black and protrusions formed of a substance with a Mohs' hardness exceeding 7, and an average height of the protrusions formed of carbon black is greater than an average height of the protrusions formed of the substance with a Mohs' hardness exceeding 7, and the reproduction head is a giant magneto resistive magnetic head.

9. A magnetic signal reproduction method reproducing magnetic signals that have been recorded on a magnetic recording medium with a reproduction head, wherein the magnetic recording medium comprises a magnetic layer comprising a ferromagnetic powder and a binder on a nonmagnetic support, wherein a height of protrusions with a protrusion density of equal to or lower than 0.002 protrusion/$\mu m^2$ on a surface of the magnetic layer as measured by an atomic force microscope is equal to or lower than 40 nm;

a density of protrusions that are equal to or higher than 15 nm in height on the surface of the magnetic layer as measured by an atomic force microscope ranges from 0.01 to 0.18 protrusion/$\mu m^2$; and the protrusions that are equal to or higher than 15 nm in height include protrusions formed of carbon black and protrusions formed of a substance with a Mohs' hardness exceeding 7, and an average height of the protrusions formed of carbon black is greater than an average height of the protrusions formed of the substance with a Mohs' hardness exceeding 7, and the reproduction head is a giant magneto resistive magnetic head.

* * * * *